(No Model.) 2 Sheets—Sheet 1.
C. A. WELLER.
PROCESS OF MOLDING PLASTIC SUBSTANCES.
No. 303,081. Patented Aug. 5, 1884.
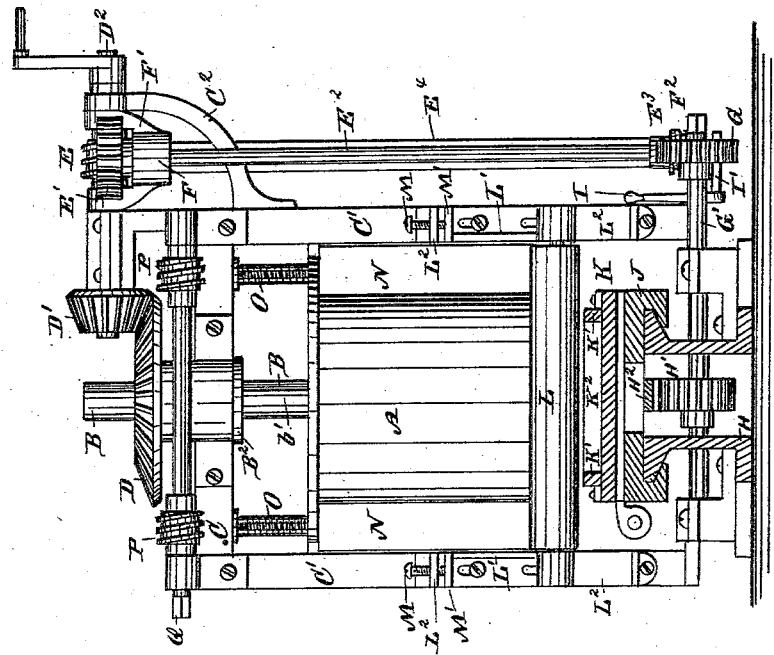
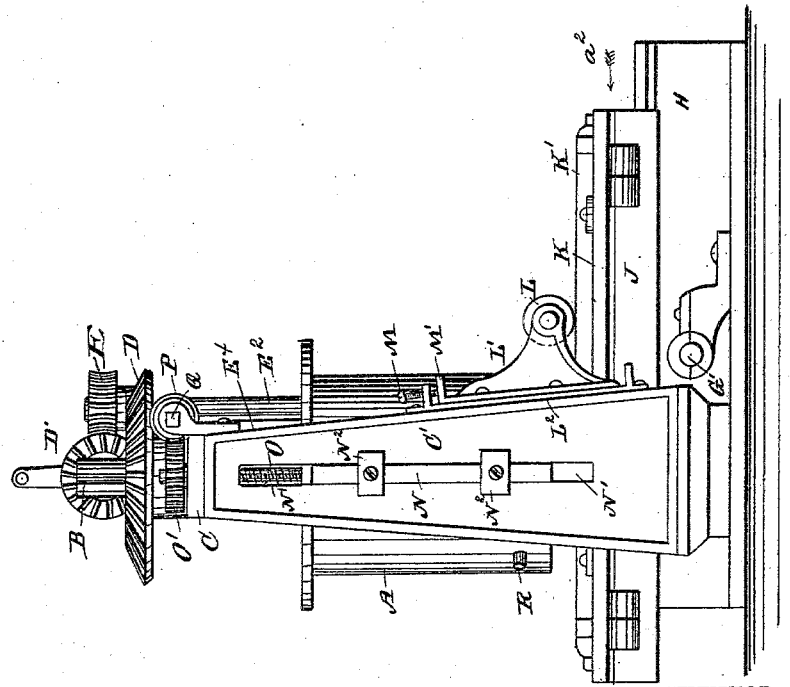
WITNESSES:
INVENTOR:
C. A. Weller
BY
ATTORNEYS.

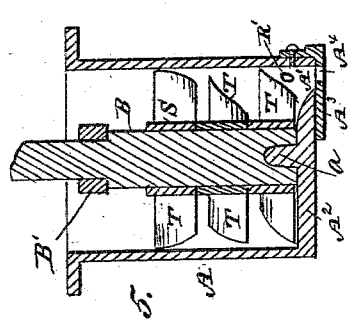
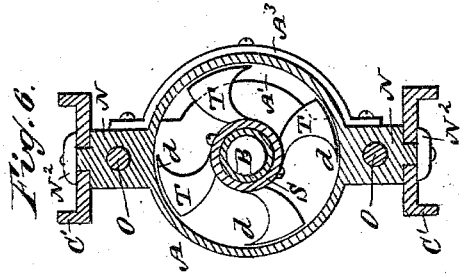
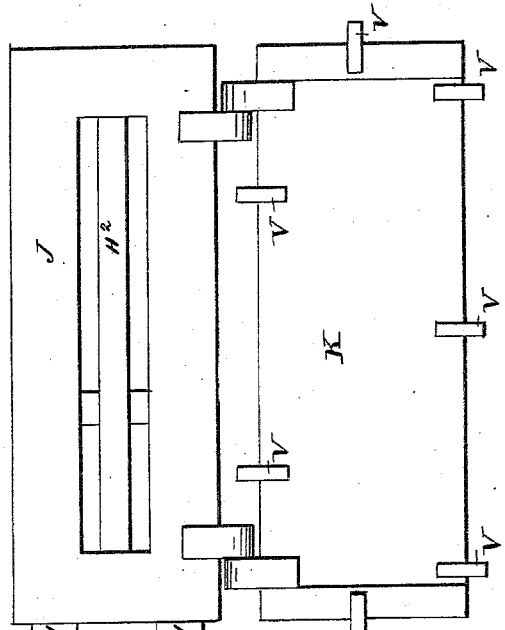
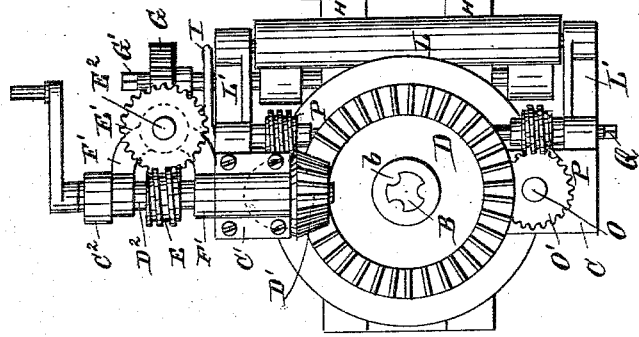
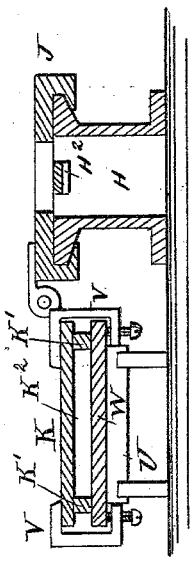

UNITED STATES PATENT OFFICE.

CHESTER A. WELLER, OF NEW YORK, N. Y., ASSIGNOR TO HIMSELF AND HERMANN BENNING, OF SAME PLACE.

PROCESS OF MOLDING PLASTIC SUBSTANCES.

SPECIFICATION forming part of Letters Patent No. 303,081, dated August 5, 1884.

Application filed October 31, 1883. (No model.)

*To all whom it may concern:*

Be it known that I, CHESTER A. WELLER, of the city, county, and State of New York, have invented a new and Improved Press for Molding Plastic Substances, of which the following is a full, clear, and exact description.

The object of my invention is to provide a new and improved press for molding plastic substances—such as clay, artificial stone compositions, &c.—into plates, slabs, tiles, &c.

The invention consists in the construction and arrangement of parts as will be hereinafter described, and specifically set forth in the claims.

Reference is to be had to the accompanying drawings, forming part of this specification, in which similar letters of reference indicate corresponding parts in all the figures.

Figure 1 is a longitudinal elevation of my improved press for molding plastic material. Fig. 2 is a front elevation of the same, parts being shown in cross-section. Fig. 3 is a plan view of the same. Fig. 4 is a cross-sectional elevation of the same showing the manner of removing the slab formed. Fig. 5 is a longitudinal sectional elevation of the mixing-cylinder. Fig. 6 is a sectional plan view of the same.

A cylinder, A, is provided in its bottom along the front half of the same with a segmental slot, A', at the inner edge of which the bottom $A^2$ of the cylinder is beveled downward, as shown in Fig. 5. To the bottom of the cylinder a plate, $A^3$, is secured, which is provided with a narrower slot, $A^4$, below the slot A'. A pintle, $a$, projects upward from the bottom of the cylinder A into the lower end of a vertical spindle, B, which is journaled in a cross-piece, B', in the top of the cylinder A, the said spindle passing through a collar, $B^2$, held to turn in a cross-piece, C, uniting two standards, C', of the frame, which standards are secured on a suitable base, H. The collar $B^2$ is provided in its inner surface with longitudinal feathers or ridges $b$, adapted to pass into corresponding grooves $b'$, in the spindle B, so that the spindle B will turn with the collar $B^2$, but can be moved longitudinally in the same.

On the upper end of the collar $B^2$ a beveled cog-wheel, D, is formed, which engages with a beveled pinion, D', mounted on one end of a shaft, $D^2$, journaled in an upper extension of one of the standards C', and in an arm, $C^2$, of the said standard, on the end of which shaft $D^2$ a crank-arm or a driving-pulley can be mounted. A worm, E, is formed on the shaft $D^2$, and engages with a worm-wheel, E', mounted on the upper end of a vertical shaft, $E^2$, journaled at its upper end in a collar, F, formed on a fork, F', mounted to swing on the shaft $D^2$, between the end of the arm $C^2$ and the standard C'. The lower end of the shaft $E^2$ is journaled in a collar, $E^3$, formed on the lower end of a bar, $E^4$, projecting downward from the fork F'.

On the lower end of the shaft $E^2$ a worm, $F^2$, is formed, which engages with a worm-wheel, G, mounted on a transverse shaft, G', journaled in the base H of the machine, and within the base a cog-wheel, H', is mounted on the shaft G', which cog-wheel H' engages with a rack, $H^2$, formed on the under side of a sliding platform, J, held to slide longitudinally on the base H, the side edges of the said platform extending down and under side flanges formed on the upper part of the said base, as shown in Figs. 2 and 4. A lever, I, is pivoted to the base of one of the standards C', and has one end forked, through which forked end a pin, I', projects, which pin is fastened to the lower collar, $E^3$. By means of the said lever the lower end of the shaft $E^2$ can be moved toward or from the worm-wheel G, and thus the worm $F^2$ can be engaged with or disengaged from the said worm-wheel G.

To one longitudinal edge of the sliding platform J a plate, K, is hinged, which is provided along its longitudinal edges with ridges K', the height of which ridges corresponds to the desired thickness of the plate or slab to be formed. The ends of the ridges K' are united by end ridges, $K^2$. In front of the lower end of the cylinder a presser-roller, L, is held, which is journaled in two bracket-plates, L', held to slide on plates $L^2$, secured to the front edges of the standards C', the said bracket-plates L' being provided with slots through which screws pass into the plates L². The plates L² are provided at the top and bottom with stops, and through the upper stops screws M pass, which also pass into top flanges, M', of the bracket-plates L', whereby, by turning the said screws M in one direction or the other, the bracket-plates L', and with them the roller L, can be raised or lowered, according to the thickness of the slab to be formed.

The cylinder A is provided with two side ridges, N, passing through vertical slots, N', in the standards C', to which side ridges, N, cross-pieces N² are fastened on the outer surface of the standard C', which cross-pieces hold the cylinder and guide it. Each vertical side ridge, N, of the cylinder is provided with a screw-threaded aperture, into which apertures screw-spindles O pass, which are journaled in the cross-piece C at each end of the same, and are provided at their upper ends with worm-wheels O', engaging with worms P on a shaft, Q, which has a squared end for applying a key. One or more short tubes, R, project from the lower end of the cylinder, through which tubes steam or water can be forced into the cylinder to loosen the plastic material in the same in case it becomes packed. On the spindle B a series of collars, S, are mounted, which are each provided with a series of screw-blades, T, the outer edges of which are curved segmentally so as to fit quite closely against the inner surface of the cylinder, and each blade T is provided with a point, d, at the upper end, which points, when the spindle B revolves, gather in and press the plastic mass downward.

The operation is as follows: The plate K is swung over the movable platform J, as shown in Figs. 1 and 2, in such a manner that the ridges K' project upward, the plastic mass is placed in the cylinder A, and the spindle B is revolved by turning the shaft D². If the spindle is revolved, the screw-blades T press the plastic mass downward and out through the slots A' and A⁴ upon the plate K, the shaft D² is revolved, and revolves the shaft G', the cog-wheel H' of which moves the platform J in the direction of its length, thereby moving the plate K from under the cylinder as fast as the plastic mass is deposited on the said plate. The roller L presses on the plastic mass on the plate K and smooths and evens the surface of the said mass. The roller L can be adjusted higher or lower, so that it will press the plastic mass flush with the upper edges of the ridges K'. After the platform J has passed entirely from under the cylinder, a plate, W, is placed on the ridges K' and is clamped to the plate K by screw-clamps V. The plate K and the plate W, clamped on the same, are then swung over in the direction of the arrow a', Fig. 4, until the plate W rests on the bucks U placed at the side of the base H. The clamps V are then removed, and the plate K is swung in the inverse direction of the arrow a', back upon the sliding platform J. The slab that has been formed on the plate K remains on the plate W, and can be carried off to a kiln or drying-room. The worm F² is then disengaged from the worm-wheel G, and the sliding platform J is pushed back in the direction of the arrow a², Fig. 1, and a fresh slab can be molded or formed.

The cylinder A must be adjusted higher or lower, according to the thickness of the slab to be formed. If the shaft Q is revolved, the worms P thereon will be revolved, and will revolve the worm-wheels O' and the screw-spindles O, which raise and lower the cylinder A.

Having thus described my invention, what I claim as new and desire to secure by Letters Patent, is—

1. In a press for molding plastic substances, the combination, with a cylinder having an opening in its bottom, and a spindle carrying screw-blades journaled in the said cylinder, of a longitudinally-sliding platform under the cylinder, and of a mold-plate hinged to the said platform, substantially as herein shown and described, and for the purpose set forth.

2. In a press for molding plastic substances, the combination, with a cylinder having an opening in its bottom, and a revolving spindle held in the same, and provided with screw-blades, of a sliding platform below the cylinder, a mold-plate hinged to the platform, and a vertically-adjustable roller in front of the cylinder, and held transversely above the sliding platform, for pressing the plastic substance into the mold as it passes from under the cylinder, substantially as herein shown and described, and for the purpose set forth.

3. In a press for molding plastic substances, the combination, with a cylinder having an opening in its bottom, and a revolving spindle held in the same, and provided with screw-blades, of a sliding platform, a plate hinged to the same, and the transverse roller L, journaled in slotted bracket-plates L', mounted on screws or studs on the plates L², said plates L² being further provided with the screws M, for moving the bracket-plates L' vertically, substantially as herein shown and described, and for the purpose set forth.

4. In a press for molding plastic substances, the combination, with the longitudinally-sliding platform J, the standards C', and the cross-piece C, of the cylinder A, provided with vertical side ridges projecting through the slots of the standards C', the screw-spindles O, mounted on cross-bar C, the worm-wheels O', mounted on the upper ends of the said spindles, the horizontal shaft Q, journaled in bearings or standards C', and the worms P, mounted on the said shaft and gearing with said worms O', whereby upon revolving shaft Q the cylinder may be adjusted vertically, substantially as herein shown and described, and for the purpose set forth.

5. In a press for molding plastic substances, the combination of the grooved spindle B, loosely mounted on the splined collar B², held in the cross-piece C, provided with the beveled cog-wheel D, formed on the collar B², the beveled pinion D', the shaft D², provided with the worm E, the worm-wheel E', mounted on the shaft E², the fork F', mounted on the shaft D², in which fork the shaft E² is journaled, the worm F², formed on the lower end of the shaft E², the worm-wheel G, on the transverse shaft G', the cog-wheel H', the sliding platform J, and the rack H² on the said sliding platform, and a lever I on standard C', engaging the lower end of the swinging shaft E², whereby the said shaft and its gearing may be disconnected from the gearing on shafts D² and G, substantially as herein shown and described, and for the purpose set forth.

6. In a press for molding plastic substances, the combination, with a cylinder and a spindle held to revolve in the same, and provided with screw-blades, of a beveled cog-wheel and a beveled pinion for revolving the spindle from a horizontal shaft, a sliding platform held on a base below the cylinder, a cog-wheel engaging with a rack formed on the under side of the sliding platform, and of a swinging shaft provided at the upper end with a worm-wheel engaging with a worm on the driving-shaft, and at the lower end with a worm engaging with a worm-wheel on the shaft on which the cog-wheel for moving the sliding platform is mounted, substantially as herein shown and described, and for the purpose set forth.

7. In a press for molding plastic substances, the combination, with the cylinder A, having a segmental slot, A', in the bottom, which slot has its inner edge beveled, of the bottom plate, A³, provided with a segmental slot, A⁴, a spindle held to turn in the cylinder, and provided with screw-blades, and of means for revolving the said spindle, substantially as herein shown and described, and for the purpose set forth.

8. In a press for molding plastic substances, the combination of a sliding platform below the cylinder, a mold-plate hinged to the said platform with the plate W fitting over the mold-plate, and the clamps V, for holding the plate W on the hinged mold-plate of the sliding platform, whereby the pressed article is held in place when the mold-plate is turned over, substantially as herein shown and described, and for the purpose set forth.

CHESTER A. WELLER.

Witnesses:
OSCAR F. GUNZ,
C. SEDGWICK.